(No Model.)
J. C. TATMAN.
GUARD RAIL FOR VEHICLE WHEELS.
No. 375,963. Patented Jan. 3, 1888.
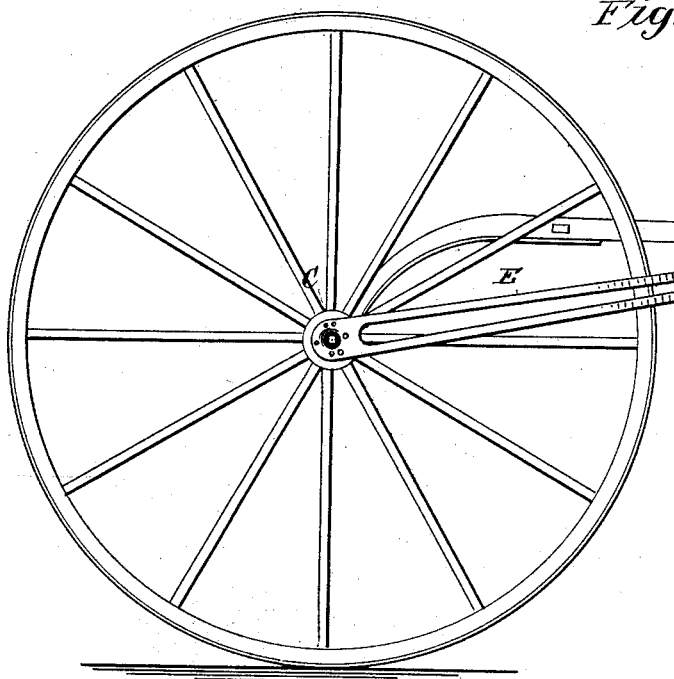
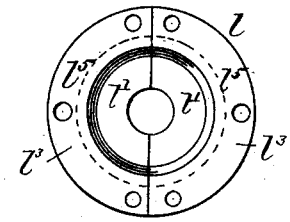
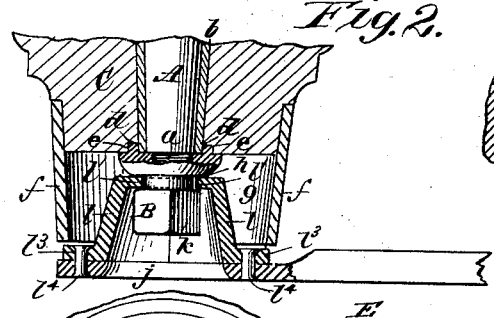
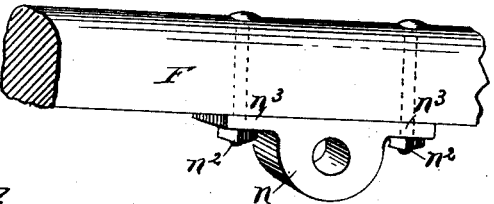
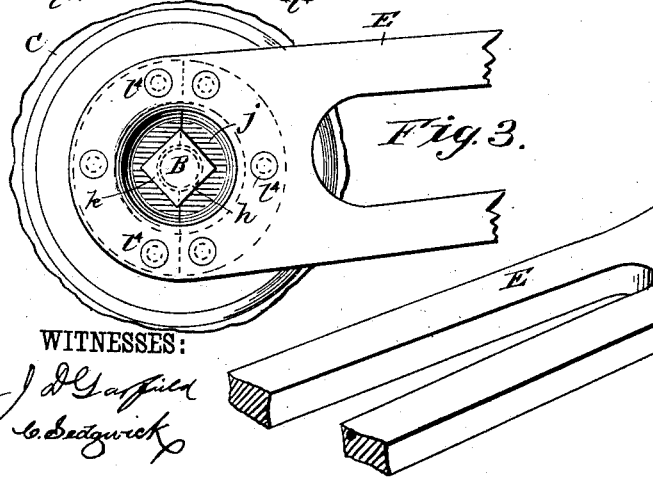
WITNESSES:
INVENTOR:
J. C. Tatman
BY Munn & Co
ATTORNEYS.

UNITED STATES PATENT OFFICE.

JOHN C. TATMAN, OF MOUNT VERNON, DAKOTA TERRITORY.

GUARD-RAIL FOR VEHICLE-WHEELS.

SPECIFICATION forming part of Letters Patent No. 375,963, dated January 3, 1888.

Application filed October 7, 1887. Serial No. 251,703. (No model.)

*To all whom it may concern:*

Be it known that I, JOHN C. TATMAN, of Mount Vernon, in the county of Davison and Territory of Dakota, have invented a new and Improved Guard-Rail for Vehicle-Wheels, of which the following is a full, clear, and exact description.

The present invention relates to guards to be arranged outside of the wheels of a buggy or other vehicle, and to be attached to the thill by its forward end and to the axle by its rear end in such manner that it will not interfere with the free turning of the wheel, the object whereof is to prevent damage to the wheel from collision or its becoming interlocked with wheels of other carriages, and also to strengthen the vehicle in the axle and thills; and it consists in the combination and formation of parts, all substantially as will hereinafter appear, and be pointed out in the claims.

Reference is to be had to the accompanying drawings, forming a part of this specification, in which similar letters of reference indicate corresponding parts in all the views.

Figure 1 is a side elevation of a buggy-wheel and the thill with the guard-rail of the present invention applied thereto. Fig. 2 is an enlarged horizontal central sectional view of a portion of the axle, and with the rear attaching end of the guard-rail in place thereupon. Fig. 3 is an enlarged face view of Fig. 2. Fig. 4 is a detached view of the hollow sectional boss, and Figs. 5 and 6 are perspective views in detail, to be hereinafter referred to.

The axle A is provided at the ends with the usual screw-threaded spindle, $a$, to receive the nut B, and the hub C may have the usual bushing, $b$, and rabbet $d$ for the rest therein of an annular rib, $e$, upon the inner face of nut, and its outer collar or rim, $f$, may project beyond the end of the hub, forming a cup-shaped opening, $g$, and the nut has a contracted neck or groove, $h$, and the enlarged polygonal portion $k$ outside thereof.

The guard-rail E has a circular opening, $j$, formed in its rear end, behind which opening is a hollow or cup-shaped boss, $l$, provided with annular internal flange, $l'$, surrounding the groove $h$ in nut and having outward flange, $l^3$, by the face of which it lies against the inside of the rear end of the rail E, and is secured thereto by rivets $l^4$, said hollow boss $l$ being formed in sections $l^5$ $l^5$, whereby its internal flange may engage with the groove $h$ of the nut before being riveted to the guard-rail, and after which it is capable, with the rail, of a rocking or rotating movement thereon. The guard-rail E thence extends forward and slightly inward, with a gradual sweep to a suitable point on the thill F—say about four and a half feet in advance of the axle—where, through a transverse hole, $m^2$, in its end $m$, it is bolted by pin or bolt $m^3$ to a drilled lug or web, $n$, secured by bolts $n^2$, or otherwise, passing through its flanges $n^3$, to and upon the under side of the thill.

The rail E has suitably formed and located upon its forward end an abutment, $m^4$; and should it be desired that the rear end of rail E be disengaged from its axle-connection, to remove the wheel or oil the axle, the nut B is unscrewed from the axle spindle $a$ and the rear end of the rail forced outwardly, the nut being carried therewith, and swung upwardly upon the bolt $m^3$ until it has passed a vertical position, when the abutment $m^4$ bears upon the web $n$, where it will be held until again tipped downwardly for its re-engagement with the axle.

It is obvious that when in place upon the thill and axle, as described, the guard-rail not only precludes danger of the wheel becoming injured by collision or interlocking, but braces and strengthens the vehicle, and the outwardly-projecting bands $f$ on the ends of the hubs cover and inclose the connections between ends of guard-rails and the axle.

Having thus described my invention, what I claim as new, and desire to secure by Letters Patent, is—

1. The combination, with the axle having a grooved nut and the thill, of a guard-rail having at one end a hollow flanged boss engaging said grooved nut and at its other end secured to the thill, substantially as and for the purpose described.

2. The combination, with the axle having a grooved nut and the thill, of a guard-rail having at one end an opening and a flanged hollow boss made in sections engaging said grooved nut, said rail at its other end secured to the thill, substantially as and for the purpose described.

3. The combination, with the axle having a grooved nut, the hub having outwardly-projecting circular bands $f$, and the thill, of a guard-rail having at one end a hollow flanged boss engaging said grooved nut and at its other end secured to the thill, substantially as and for the purpose described.

4. The combination, with the axle and the thill having the flanged and apertured web secured thereto, of the guard-rail pivotally secured to the axle and to the said apertured web, all substantially as and for the purpose described.

5. The combination, with the axle and the thill having the flanged and apertured web secured thereto, of the guard-rail pivotally secured at one end to the axle and provided at its other end with a stop or abutment, $m^4$, and pivotally secured to said apertured web, substantially as and for the purpose described.

6. The combination, with the axle having a grooved nut, B, the hub having outwardly-projecting circular band $f$, and the thill having the flanged and apertured web $n$, of the guard-rail having at one end an opening, $j$, and a flanged hollow boss, $l$, made in sections, engaging said grooved nut, said rail provided at its other end with a stop or abutment, $m^4$, and pivotally secured to said apertured web, all substantially as and for the purpose described.

JOHN C. TATMAN.

Witnesses:
E. S. JOHNSTON,
H. E. BIXBY.